United States Patent [19]
Katoh et al.

[11] Patent Number: 5,593,218
[45] Date of Patent: Jan. 14, 1997

[54] HIGHLY ELASTIC RUBBER CRAWLER

[75] Inventors: Yusaku Katoh; Tsuyoshi Uchiyama, both of Hiroshima-ken, Japan

[73] Assignee: Fukuyama Gomu Kogyo Kabushiki Gaisha, Hiroshima-ken, Japan

[21] Appl. No.: 142,347

[22] PCT Filed: May 27, 1992

[86] PCT No.: PCT/JP92/00691

§ 371 Date: Jan. 24, 1994

§ 102(e) Date: Jan. 24, 1994

[87] PCT Pub. No.: WO92/21549

PCT Pub. Date: Dec. 10, 1992

[30] Foreign Application Priority Data

May 31, 1991 [JP] Japan .................................. 3-229826

[51] Int. Cl.⁶ .................................................. B62D 55/24
[52] U.S. Cl. ........................... 305/174; 305/177; 305/197
[58] Field of Search ............................ 305/35 R, 35 EB, 305/38, 39, 21, 24, 56, 57

[56] References Cited

U.S. PATENT DOCUMENTS

| 2,476,828 | 7/1949 | Skromme | 305/38 |
| 3,900,231 | 8/1975 | Ohm | 305/35 EB |
| 4,057,302 | 11/1977 | Caravito | 305/38 X |
| 4,407,550 | 10/1983 | Lapsys | 305/38 X |
| 4,449,627 | 5/1984 | Kell | 305/35 EB X |

FOREIGN PATENT DOCUMENTS

| 34-7957 | 9/1959 | Japan . | |
| 50-34818 | 11/1975 | Japan . | |
| 53-830 | 1/1978 | Japan . | |
| 55-118572 | 9/1980 | Japan . | |
| 0140662 | 11/1980 | Japan | 305/38 |
| 0015081 | 1/1982 | Japan | 305/38 |
| 0030667 | 2/1982 | Japan | 305/35 R |
| 59-11469 | 3/1984 | Japan . | |
| 2117276 | 9/1990 | Japan . | |
| 0279474 | 11/1990 | Japan | 305/35 EB |

Primary Examiner—Russell D. Stormer
Attorney, Agent, or Firm—Lane, Aitken & McCann

[57] ABSTRACT

The present invention relates to a highly elastic rubber crawler mounted on a mobile working machine, the crawler having improved durability, easily passing around a drive wheel and inflicting no damage on a paved road surface. Specifically, a highly elastic rubber crawler defines engageable holes in the main body of the crawler into which the tops of teeth of a drive wheel are fitted, engageable portions between engageable holes for meshing with the roots of the teeth of the drive wheel, projections at both sides of the engageable portion for preventing the drive wheel from falling off the crawler, and lugs projecting from an outer peripheral surface. The inner peripheral layer including the projections is formed of highly rigid urethane rubber, the outer peripheral layer including the lugs is formed of vulcanized rubber or an equivalent elastic member, and, on the inner peripheral layer in the vicinity of a border surface between the inner peripheral layer and the outer peripheral layer in the main body of the crawler, reinforcing cords having high strength are aligned and embedded in the circumferential direction of the crawler at both sides of the engageable holes, and other reinforcing cords are embedded at the engageable portions in a direction perpendicular to the circumferential direction.

13 Claims, 5 Drawing Sheets

HIGHLY ELASTIC RUBBER CRAWLER

FIELD OF THE INVENTION

The present invention relates to a highly elastic rubber crawler to be mounted on a mobile working machine.

BACKGROUND OF THE INVENTION

Figure 5A:
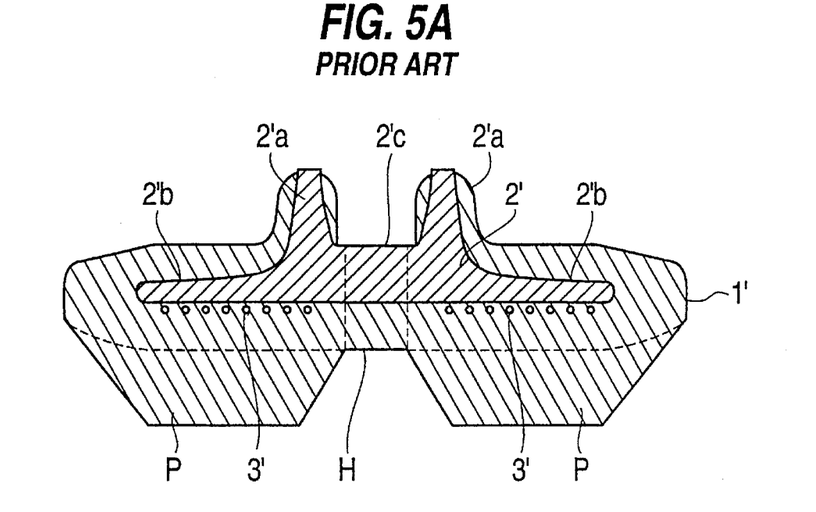
FIG. 5A is a sectional view and FIG. 5B is a plan view.
Figure 5B:
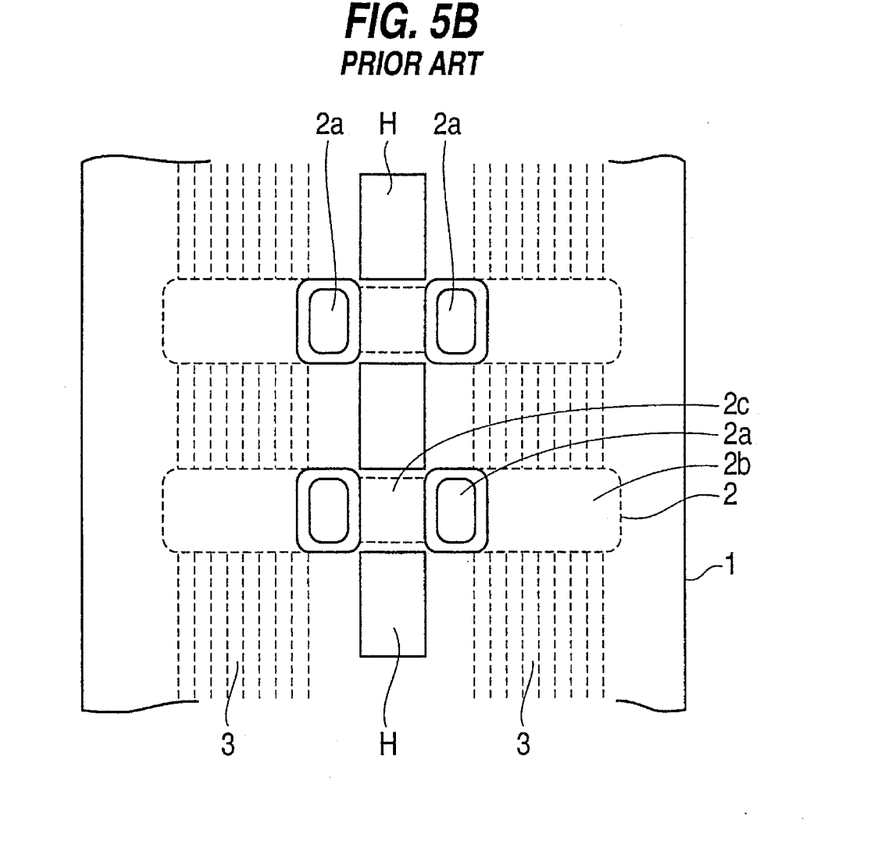

The main body of a conventional rubber crawler is formed of vulcanized rubber chiefly consisting of natural rubber. As shown in FIGS. 5A and 5B, metal core bars 2' are embedded in the circumferential direction of the rubber crawler body 1' at a fixed interval; a number of steel cords 3' are aligned and embedded on the ground side of the core bar 2' (steel cords 3' are split on both sides of engageable holes H for a driving sprocket and embedded to comprise a layer under wing portions 2'b of the core bars 2'); and ground face lugs P formed of the vulcanized rubber are provided on the ground side of the rubber crawler body 1'.

To compare with a steel crawler, this rubber crawler has many advantages, especially in not damaging a paved road surface, and therefore has been in wide use.

However, it still has problems such as producing mechanical noise and vibrations due to lack of support for rolling wheels at the intervals between core bars, as well as having great weight because a great number of core bars, steel cords etc. are to be embedded in the crawler body to resist the great driving force from a driving sprocket. Besides, the driving sprocket may fall off the crawler due to the lack of the rigidity of the crawler body between the embedded core bars.

On the other hand, a rubber crawler wherein the whole body is composed of highly elastic and rigid urethane rubber seems to solve the above problems.

However, it also has the following problems:

(a) It causes trouble in rolling and meshing with a driving sprocket because the high elasticity of the crawler makes the whole crawler body hard to bend.

(b) Though urethane rubber has a good durability against compression and distortion, its durability against extension is poor, and therefore cracking and cut flows grow rapidly in the continuously stretched parts. As a result, reinforcing members in the crawler body are exposed to the outside and to damage.

(c) Urethane rubber has a problem with abrading concrete road surfaces. (In this regard, urethane rubber is not always superior to vulcanized rubber, such as natural rubber, etc.)

(d) Urethane rubber is expensive.

The purpose of the present invention, therefore, is to solve the above problems with a highly elastic rubber crawler having no core bars. That is, no conventional core bars having projections are embedded.

SUMMARY OF THE INVENTION

A first aspect of the invention relates to a rubber crawler wherein engageable holes in which the top of teeth of a driving sprocket are fitted are provided in the middle of the crawler body at a fixed interval, engageable portions for being in mesh with the roots of teeth of the driving sprocket are provided between the engageable holes, projections for preventing the drive wheel from falling off the crawler are provided at both sides of the engageable holes and engageable portions on the inner peripheral face, and lugs project from the outer peripheral surface thereof. The inner peripheral layer including the projections is formed of highly rigid urethane rubber, while the outer peripheral layer including the lugs is formed of vulcanized rubber, such as natural rubber, or an equivalent elastic member. On the side of the inner peripheral layer in the vicinity of a border surface between the outer peripheral layer and the inner peripheral layer, on both sides of said engageable holes in the crawler body, first reinforcing cords having high strength are aligned and embedded in the circumferential direction of the crawler at both sides of the engageable holes and second reinforcing cords are aligned and embedded in a direction perpendicular to the circumferential direction at the engageable portions. The second reinforcing cords embedded at the engageable portion wrap above and below first the reinforcing cords aligned and embedded in the circumferential direction, and the opposite ends of the second wrapping reinforcing cords are overlapped and embedded in the upper center part so that strength against breaking can be increased on the whole surface of the engageable portion.

The above rubber crawler has no core bars, that is, no embedded conventional core bars having projections. The main body is divided into the inner and outer peripheral layers in the thickness direction. Since the inner peripheral layer is formed of highly rigid urethane rubber, the projections for preventing a driving sprocket from falling off the crawler body, which protrudes on the inner peripheral layer, become strong and rigid enough, and the whole inner peripheral side of the crawler body including the projections becomes highly rigid, and therefore disengagement of the crawler hardly occurs. Besides, since the outer peripheral layer is formed of a vulcanized rubber, such as natural rubber, etc., or an equivalent elastic member, the whole outer peripheral layer including the lugs on the ground side becomes flexible, and therefore is easily deflected toward the inner peripheral side.

Moreover, since the first reinforcing cords having high strength are aligned and embedded in the circumferential direction of the crawler on the side of the inner peripheral layer in the vicinity of a border surface between the inner and outer peripheral layers, the crawler body does not extend in the circumferential direction, thereby effecting smooth conveyance of the driving force. Furthermore, because at rolling parts of the crawler in engagement with a driving sprocket, etc., the inner peripheral side is compressed, centering the reinforcing cords, the inner peripheral layer (urethane rubber) is only slightly compressed and distorted, but never elongated, thereby effecting good durability.

On the other hand, since the second reinforcing cords are aligned and embedded inside the engageable portions in a direction perpendicular to the circumferential direction to reinforce there, engagements with a driving sprocket can be smoothly carried out. In this case, the second reinforcing cords embedded at the engageable portions are embedded in such a state that they wrap above and below the reinforcing cords aligned and embedded in the circumferential direction and that the opposite ends of the wrapping second reinforcing cords are overlapped at the upper center part so that the strength of the engageable portions may be further increased.

In another aspect of the present invention, the above projections for preventing a driving sprocket from falling off the crawler body are staggered on the right and left sides of the engageable holes and engageable portions, and a rolling track (the top faces of the projections) becomes almost continuous in the circumferential direction of the crawler, thereby preventing mechanical noise and vibrations. The projections are at the both edges of the engageable portions on one side of the holes, while in the almost middle part of the engageable hole or engageable portion on the other side of the holes, and a portion of the inner peripheral layer surrounded by three projections on the right and left sides of the engageable portion is integrally formed as the thick portion, whereby the rigidity of the engageable portion is further increased. Intervals between projections where the intervals are at almost the middle parts of the engageable holes are made wider than intervals between projections, where the intervals are at almost the middle parts of the engageable portions, whereby the intervals at almost the middle parts of the engageable holes become easily bent to the inner peripheral side, thereby effecting easy engagements with a driving sprocket or an idler.

In yet another aspect of the invention, a rubber crawler device has installed thereon a highly elastic rubber crawler, wherein engageable holes into which the tops of teeth of a driving sprocket are fitted are provided in the middle of the crawler body at a fixed interval, engageable portions for being in mesh with the roots of teeth of the driving sprocket are provided between the engageable holes, projections for preventing the driving sprocket from falling off the crawler body are provided at both sides of the engageable holes and the engageable portions on the inner peripheral face, lugs project from the outer peripheral surface of the crawler, the inner peripheral layer including the projections is formed of highly rigid urethane rubber, and the outer peripheral layer including the lugs is formed of a vulcanized rubber such as natural rubber, or an equivalent elastic member. The width of an idler of the rubber crawler device is made almost the same as the transverse distance between the projections for preventing, at both sides of the rolling track, the idler from falling off the crawler body. According to the present invention, since there is no space between the right and left projections and the idler, the crawler body does not warp to the inner peripheral side, even if great tensile force is applied to the crawler, thereby avoiding cutting of the reinforcing cords.

Still another aspect of the present invention relates to a method of manufacturing a highly elastic rubber crawler whose inner peripheral layer includes projections for preventing a driving sprocket or idler from falling off the crawler body. The projections protrude from the inner peripheral layer, and the projections and inner peripheral layer are formed of highly rigid urethane rubber. An outer peripheral layer including ground lugs provided on the outer peripheral face is formed of vulcanized rubber, such as natural rubber, or an equivalent elastic member. An endless outer peripheral layer is formed by being pressed and vulcanized as in the conventional method of producing a rubber crawler, and then on the non-ground side of the outer peripheral layer, liquid urethane rubber is injected and molded to form an inner peripheral layer. In this case, with the ground lugs of said endless outer peripheral layer placed on the inner peripheral side, liquid urethane rubber is injected and molded on the outer peripheral side to form the inner peripheral layer, and then the crawler is turned inside out to place the inner peripheral layer on the outside and the outer peripheral layer on the inside. Accordingly, the whole periphery of the inner peripheral layer is always slightly compressed, but never elongated, thereby effecting excellent durability.

BRIEF DESCRIPTION OF THE DRAWINGS

FIG. 5 shows a conventional rubber crawler.

DETAILED DESCRIPTION OF PREFERRED EMBODIMENTS

The details of the present invention are now explained according to the enclosed drawings.

FIG. 1A–1D illustrate a rubber crawler of this invention. In the figure, R is a rubber crawler body, 1 is an inner peripheral layer made of highly rigid urethane rubber, and 2 is an outer peripheral layer made of vulcanized rubber chiefly consisting of natural rubber.

Figure 1A:
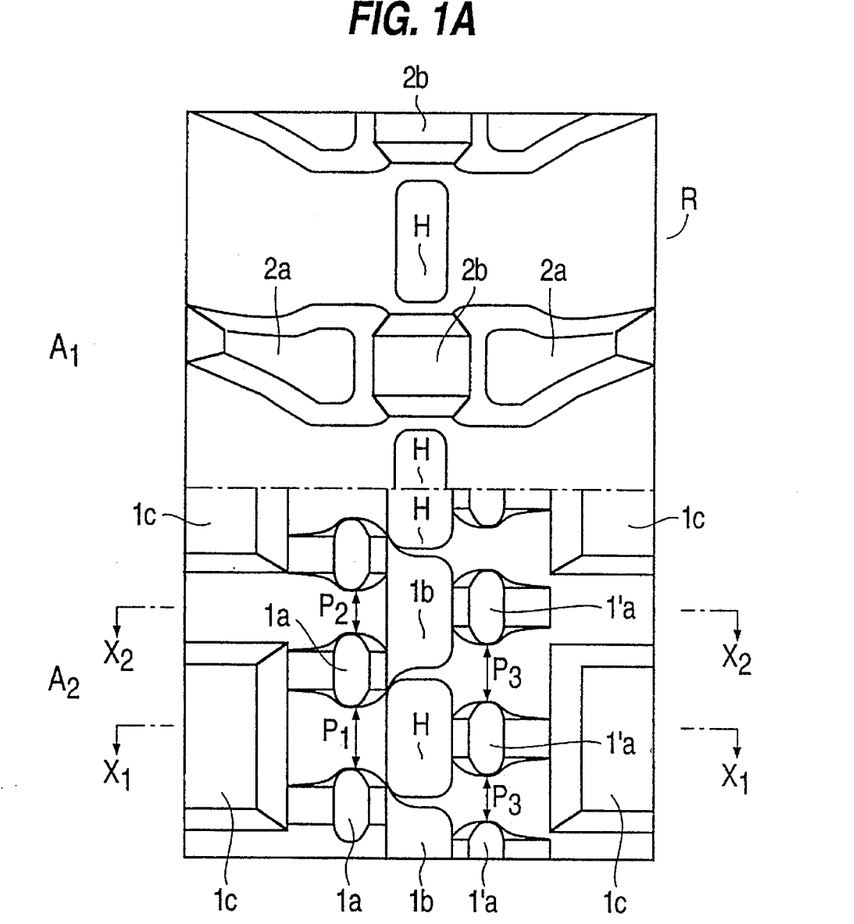
FIG. 1A is a plan view of a rubber crawler of the present invention.

In FIG. 1A, 1a and 1a' are projections provided on the inner peripheral layer to prevent a drive wheel from falling off the rubber crawler body R. Since those projections are staggered at the right and left sides of engageable portions 1b and engageable holes H which are formed in the center of the crawler body R at fixed intervals, the track for a rolling wheel, formed by the top faces of the projections 1a, 1a' for supporting the rolling of outer portions $T_1$ of a centrally flanged wheel T, becomes almost continuous in the circumferential direction of the crawler, thereby preventing mechanical noise and vibration. In this case, the projection may be provided at any position on the inner peripheral layer, because it is formed by protruding urethane rubber of the inner peripheral layer in the present invention, while in a conventional rubber crawler the protruding position of the projection is limited to where core bars are embedded, because the projection is formed integrally with the core bar.

In FIG. 1A, a comparatively thick engageable portion 1b (meshed with the roots of teeth of a sprocket) is formed at the front and back of the engageable hole H. Since the adjacent projections 1a, 1a standing collaterally at the left side of the engageable portion 1b and the projection 1a' at the right side thereof are integrally formed as the thick parts, the crawler body R is not bent at the intervals $P_2$ between the projections at the left side of the engageable portion 1b even when in rolling engagement with a driving sprocket. On the other hand, the crawler body R is formed as thin as possible at the intervals $P_1$ between the projections at the left side of the engageable hole H and at the front and back intervals $P_3$ between the projections 1a' at the right side thereof so as to be bent easily in those areas. Besides, to have $P_1 > P_2$, the interval $P_1$ is formed as wide as possible so as to diffuse distortions produced at the portion of the crawler body in rolling engagement with a driving sprocket.

1c is a thin portion for making the crawler easy to be bent at the engageable hole H and also to reduce the amount of urethane rubber.

In FIG. 1A, 2a is a ground lug provided on the outer peripheral layer. 2b is a center lug to connect the right and left ground lugs 2a, 2a located in the front and back of the engageable hole H, that is, the center lug 2b is the rear side of the engageable portion 1b on the inner peripheral layer.

Figure 1B:
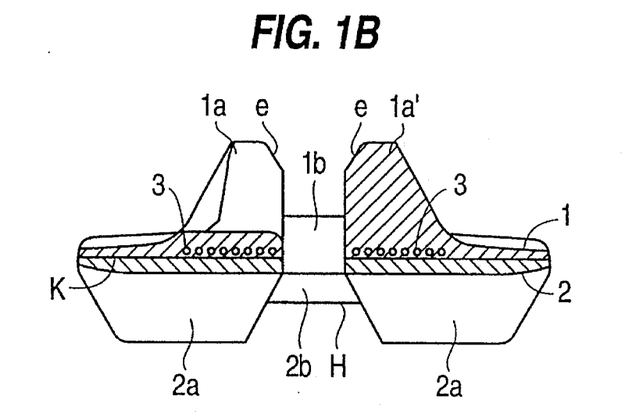
FIG. 1B is a sectional view along the line X1—X1 in FIG. 1A.
Figure 1C:
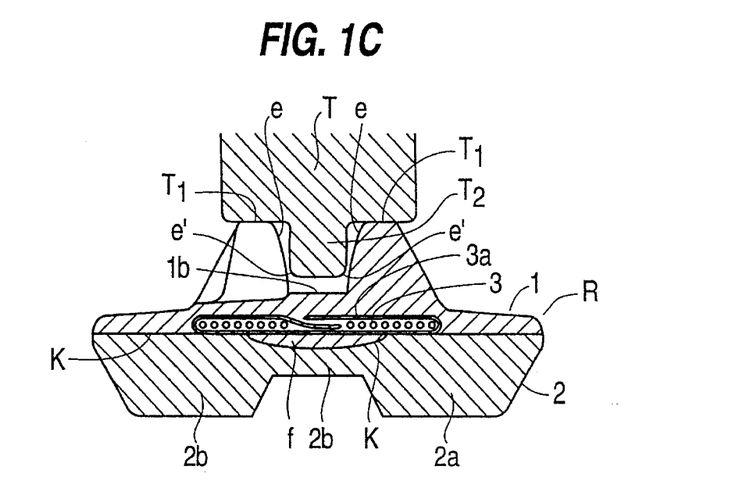
FIG. 1C is a sectional view along the line X2—X2 in FIG. 1A.
Figure 1D:
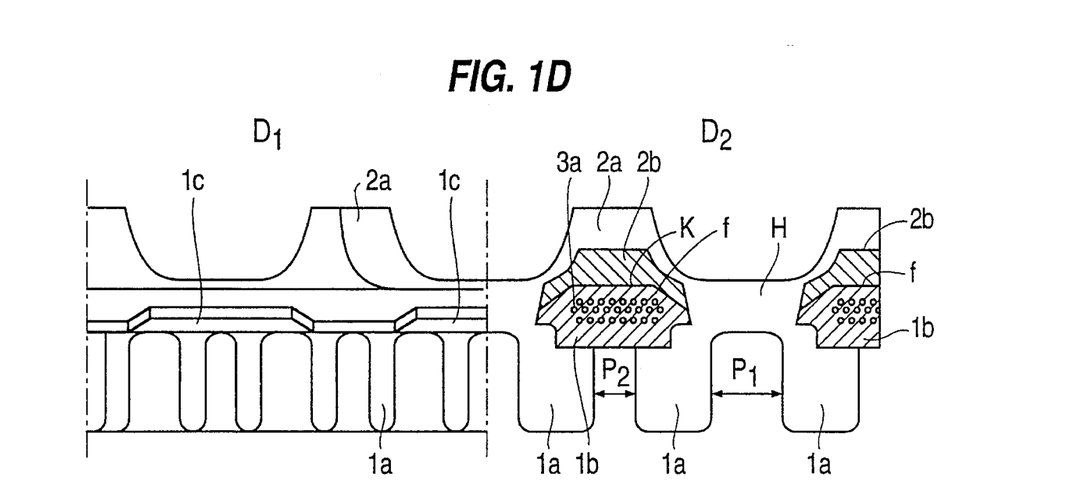
FIG. 1D and FIG. 1D are a side elevational view and a sectional view, respectively, along the center line in FIG. 1A.

As shown in FIGS. 1B and 1C, being split on both sides of an engageable hole H, first reinforcing cords 3 are aligned and embedded to circle around in the inner peripheral layer 1, adjacent to a border surface K, in the circumferential direction. Second reinforcing cords 3a are aligned and embedded inside the engageable portion 1b in a direction perpendicular to the circumferential direction, and wrap the first reinforcing cords 3 embedded in the circumferential direction, as shown in FIG. 1C. The second reinforcing cords 3a may be doubled or tripled. The character f indicates a bulge for thickening the inner peripheral layer 1 (urethane rubber) under the second reinforcing cords 3a. This bulge f as well as the center lug 2b reinforces the part under the second reinforcing cords 3a so as not to be easily damaged, even when in contact with obstacles on the ground, and eventually prevents the second reinforcing cords 3a from being exposed and damaged.

Figure 2A:
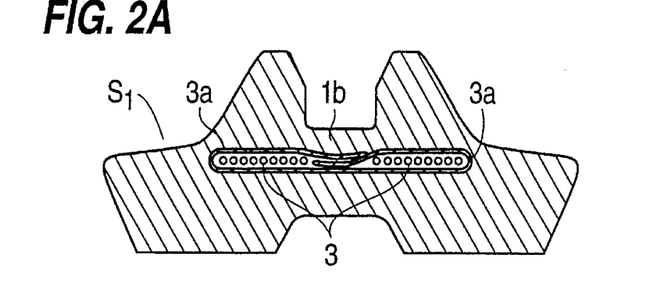
FIGS. 2A–2C are sectional views, showing the ways of embedding reinforcing cords in the engageable portions.
Figure 2B:
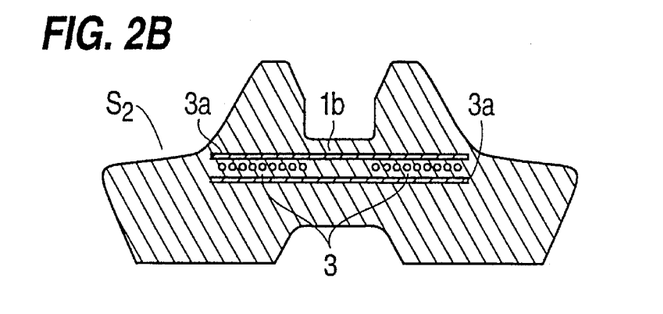
Figure 2C:
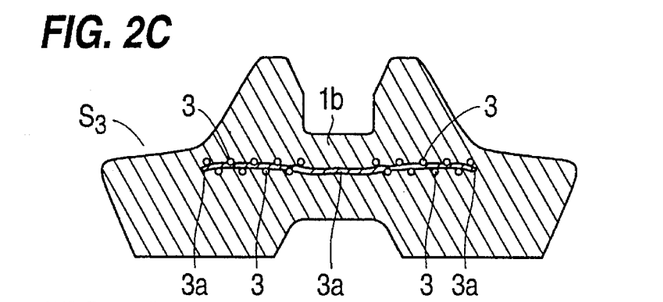

FIGS. 2A–2D illustrate the results of experiments on burying the second reinforcing cords 3a in the engageable portion 1b. FIGS. 2A–2C are sectional views, showing the burying arrangements of the second reinforcing cords 3a in samples $S_1$, $S_2$, and $S_3$, respectively. In the sample $S_1$, the second reinforcing cords 3a continuously wrap above and below the first reinforcing cords 3 embedded in the circumferential direction across the whole width of the first reinforcing cords 3, and the opposite ends of the second reinforcing cords 3a are overlapped on the upper center part. In the sample $S_2$, the second reinforcing cords 3a are provided above and below the first reinforcing cords 3 in double layers. In the sample $S_3$, the second reinforcing cords 3a are provided in a single layer, passing above and under the first reinforcing cords 3.

Figure 2D:
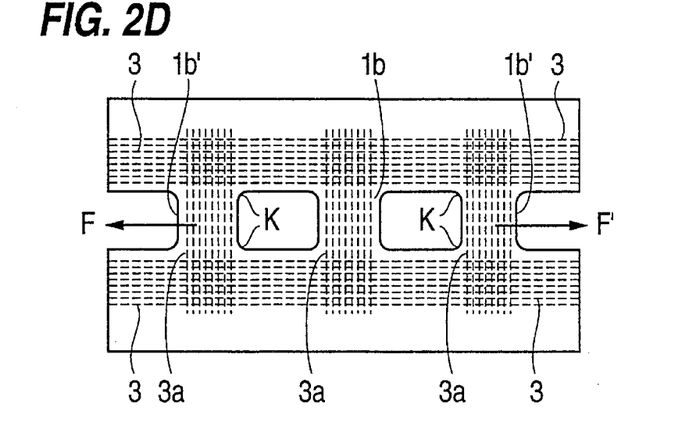
FIG. 2D is a plan view, showing the examining method.

FIG. 2D shows an experimental method, wherein the engageable portions 1b', 1b' in the figure are pulled in the directions F and F', respectively, to measure the strength against breaking. As the result of the experiment, the ratio of strength is 2.0 in $S_1$, 1.9 in $S_2$, and 1.0 in $S_3$, that is, $S_1 \geqq S_2 > S_3$. However, when the conditions of the broken parts are compared, in the sample $S_1$ the first reinforcing cords 3 embedded in the circumferential direction are cut at the roots K of the engageable portions 1b', while in the sample $S_2$ the second reinforcing cords 3a embedded in the width direction are pulled out at the roots K. This means that in the sample $S_1$ the strength against breaking can be enlarged if stronger reinforcing cords are applied. Accordingly, it is understood that the burying arrangement in the sample $S_1$ is superior to that in sample $S_2$.

The first and second reinforcing cords 3, 3a are made of highly strong and elastic fibers which are hardly elongated, such as carbon fibers, aramid fibers, polyarylate fibers, etc. Besides, they may be made of highly strong but somewhat less elastic materials such as nylon, polyester, or vinylon, and also steel cords may be used as the first reinforcing cords 3 to be embedded in the circumferential direction.

Figure 3A:
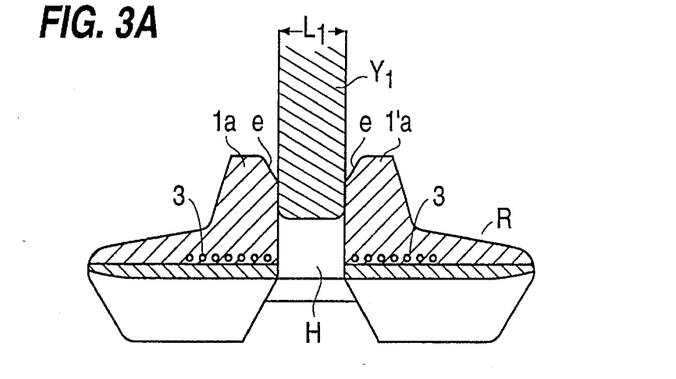
FIG. 3 is a sectional view of a rubber crawler of this invention winding around an idler.
Figure 3B:
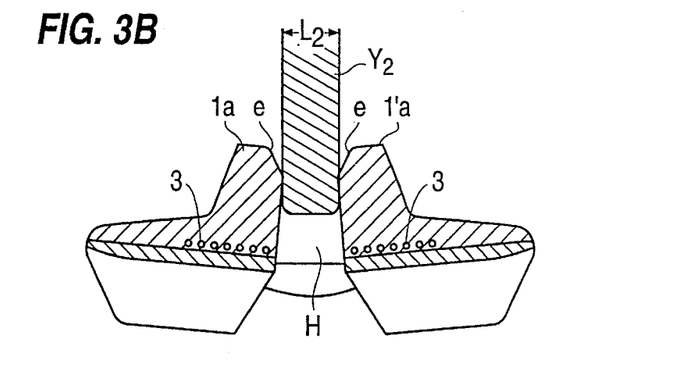

FIGS. 3A and 3B show the rubber crawler of this invention winding around an idler. In FIG. 3A, the dimension of the width $L_1$ of the idler $Y_1$ is almost the same as the interval of the right and left projections 1a, 1a'. Because the projections are made of the inner peripheral layer (urethane rubber), there is no trouble in their contacting a steel idler. In this example, since there is no space between the projections 1a, 1a' and the idler $Y_1$, the crawler body is not warped to the inner peripheral side in the width direction thereof, even if great tensile force is applied to the crawler, and therefore there is no cutting of the reinforcing cords as mentioned later.

In FIG. 3B, the width $L_2$ of the idler $Y_2$ is smaller than the interval of the projections, and the crawler body is warped when great tensile force is applied thereto. In this case, because the right and left projections 1a, 1a' are bent until they reach the side faces of the idler $Y_2$, respectively, the crawler body is warped to the inner peripheral side in the width direction thereof. Under this condition, the tensile force concentrates on some cords near to the center, in the width direction, of the circumferential reinforcing cords 3. Accordingly, from the center to the width ends the reinforcing cords are instantaneously cut one after another.

To cope with this situation of having great tensile force, one or some of the circumferential reinforcing cords 3 nearest to the center are made especially strong, or the reinforcing cords 3 are embedded in double around the center portions.

Besides, in this embodiment, (a) the four corners of the engageable hole H have a relatively big curvature to prevent distortions from concentrating on these parts and causing cracks, and (b) as shown in FIGS. 1B and 1C, the inner side wall of the projection is provided with an inclined face e so that even when the inner wheel $T_2$ runs on the projection 1a it may slip off the inclined face e and not fall off the crawler. Furthermore, the central flange $T_2$ is also chamfered off, as at e', to have further effect in preventing the wheel from falling off the crawler.

Figure 4:
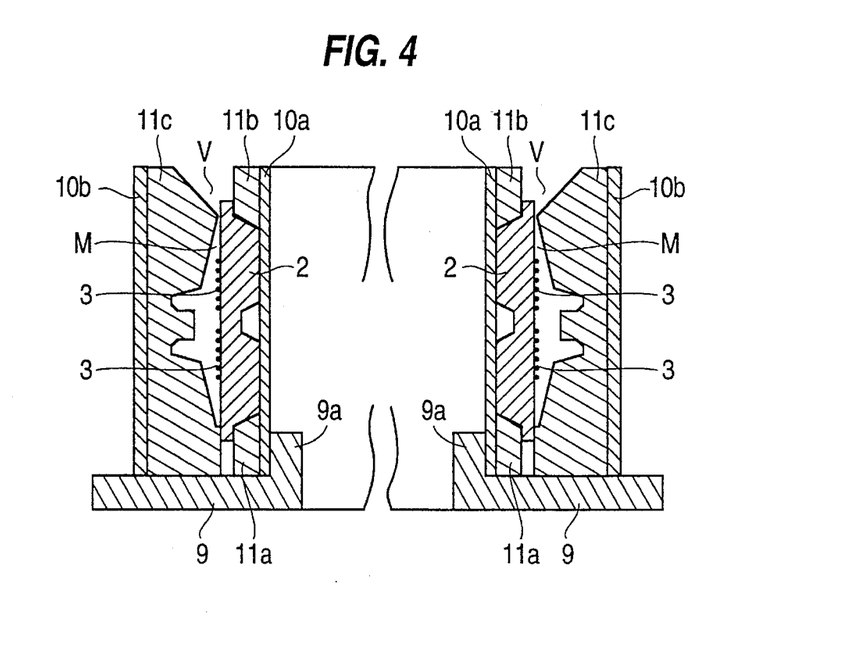
FIG. 4 is a sectional view of manufacturing setup for a rubber crawler of this invention.

The method of producing this embodiment is now explained. First, an endless outer peripheral layer 2 (vulcanized rubber) is formed by the conventional method of producing a rubber crawler, and then as shown in FIG. 4, an inner peripheral layer (urethane rubber) is injected and molded on the non-ground side of the outer peripheral layer 2. In this figure, 9 is an annular fixed plate having a vertical frame; 9a, 10a and 10b are an inner frame plate and an outer frame plate, respectively; 11a and 11b are packing rubbers; and 11c is a mold having an opening in its inside for forming the inner peripheral layer. These members are annularly assembled on the fixed plates 9, 9 to form an endless body. The character v indicates a filler hole for liquid urethane rubber.

According to FIG. 4, the processes of injecting and molding urethane rubber are explained in detail. The inner frame plates 10a, 10a are vertically fixed on the fixed plates 9, 9 along the vertical frames 9a, 9a. Next, from the bottom of the inner frame 10a to the top, the packing rubber 11a, the outer peripheral layer 2 (with the ground lug on the inner peripheral side), and the packing rubber 11b are installed and fixed in order. In this case, the surface of the outer peripheral layer 2 is treated with primer and adhesive in advance.

The first reinforcing cords 3 are wound around the fixed areas of the outer peripheral layer 2, and the second reinforcing cords 3a are fixed to the expected areas of engageable portions. In addition, the mold 11c is fixed to the outer periphery of the outer peripheral layer 2, and then the outer frame plate 10b is installed and fixed to the outer side of the mold 11b.

Then, liquid urethane rubber is injected in the mold 11c from the filler hole v, and after curing the urethane rubber, the molded rubber crawler is taken out. However, since the inner peripheral layer 1 and the outer peripheral layer 2 of the taken out rubber crawler are in reverse order, the crawler is to be turned inside out in its use.

In the above producing processes, the reason why the inner peripheral layer 1 (urethane rubber) is molded on the outer peripheral side is that by molding the urethane rubber on the outer peripheral side and turning it into the inner peripheral side, the whole periphery of the inner peripheral layer is always slightly compressed. When this rubber crawler is installed on a crawler device, this compressed ratio is a little increased on the rolling parts with a driving wheel or guiding wheel, while a little decreased on the flat ground, but the rubber crawler still remains in a slightly compressed condition. Accordingly, the whole inner peripheral layer is always compressed and not elongated, thereby effecting the excellent durability.

In contrast, if the inner peripheral layer is injected and molded on the inner peripheral side from the beginning, the inner peripheral layer is elongated on the flat ground, though a little compressed at the rolling parts, thereby causing remarkable decrease of the durability.

In the present invention, the outer peripheral layer 2 is formed of vulcanized rubber, such as natural rubber, etc., or an equivalent elastic member. That is, it may be formed of thermoplastic elastomer, etc., as well as vulcanized rubber of natural rubber and synthetic rubber.

In the rubber crawler according to the present invention, as described above, since the inner peripheral layer 1 is formed of highly rigid urethane rubber, it is especially excellent in preventing the crawler from falling off. Besides, since the outer peripheral layer 2 is formed of the same vulcanized rubber as in a conventional rubber crawler, the outer peripheral layer and the ground lugs of the crawler body are flexible and easy to be bent, thereby easily winding around a drive wheel without damaging a paved road. Besides, since there are no embedded conventional core bars having projections, the weight of the crawler body can be greatly decreased.

Moreover, since on the side of the inner peripheral layer in the vicinity of a border surface between the inner peripheral layer and the outer peripheral layer reinforcing cords having high strength are embedded to be a continuous layer in the circumferential direction: (a) at the rolling parts with a driving wheel, the inner peripheral layer made of urethane rubber is only repeatedly compressed and never elongated, thereby effecting good durability of the inner peripheral layer; (b) the border surface is hardly compressed nor elongated, thereby preventing distortions, and any minute distortion is diffused by reinforcing cords, thereby preventing interfacial breakaways; and (c) if high strength fiber cords are used as reinforcing cords 3, 3a, liquid urethane rubber is infiltrated deep into the cords so that they can be firmly bonded and united with each other at the inside of the inner peripheral layer, thereby effecting the excellent durability of the rubber crawler.

Furthermore, since in the inner peripheral layer of the engageable portions reinforcing cords having high strength are aligned and embedded in a direction perpendicular to the circumferential direction, the rigidity at the engageable portions is increased, thereby ensuring the engagement with a driving sprocket. In the rubber crawler wherein the reinforcing cords embedded in the engageable portions wrap above and below of the reinforcing cords of the circumferential direction and the ends of the wrapping cords are overlapped at the upper center position, the rigidity and the strength of the cords against breaking at the engageable portions are further increased, thereby effecting excellent transmission of driving force and durability etc.

We claim:

1. A method of manufacturing a highly elastic rubber crawler in which no core bars are embedded and whose inner peripheral layer (1) including projections (1a, 1a') for preventing falls which protrude on the inner peripheral face of the crawler body (R) is formed of highly rigid urethane rubber and whose outer peripheral layer (2) including ground lugs (2a, 2b) provided on the outer peripheral face is formed of vulcanized rubber such as natural rubber or an equivalent elastic member, wherein first an endless outer peripheral layer (2) is formed by being pressed and vulcanized as in the conventional method of producing a rubber crawler, and then on the non-grounding side of the outer peripheral layer (2) liquid urethane rubber is injected and molded to form the inner peripheral layer (1).

2. A method of manufacturing a highly elastic rubber crawler according to claim 1 in which no core bars are embedded, wherein with the grounding lugs of said endless outer peripheral layer (2) placed on the inner peripheral side, liquid urethane rubber is injected and molded on the outer peripheral side to form the inner peripheral layer (1), and then it is turned inside out to place said inner peripheral layer (1) on the inner peripheral side and the outer peripheral layer (2) on the outer peripheral side, respectively.

3. A highly elastic rubber crawler for use in connection with a drive wheel having teeth having roots, comprising a crawler body having a length, opposed sides, an inner peripheral layer and an outer peripheral layer, the crawler body further having a plurality of holes defined in the crawler body between the opposed sides and at a fixed interval from one another, a plurality of engageable portions in the crawler body between said holes, the engageable portions being meshable with the roots of the teeth of the drive wheel, lugs projecting from the outer peripheral layer of the crawler body, projections at opposite sides of said holes and said engageable portions for preventing the drive wheel from falling off the crawler body, the projections along one side of the holes and engageable portions being staggered from the projections along the opposite side of the holes and engageable portions, with the projections along one side of the holes and engageable portions being in general alignment with centers of the holes and the engageable portions in a direction perpendicular to the length of the crawler body, and the projections at the opposite side of the holes and engageable portions being generally offset from the centers of the holes and the engageable portions in a direction perpendicular to the length of the crawler body, the crawler body having thick portions each defined by one of the engageable portions, the projection along one side of the engageable portion in general alignment with the center of the engageable portion, and the two projections along the side of the engageable portion and offset from the center of the engageable portion.

4. A highly elastic rubber crawler according to claim 3, wherein there are first intervals between the projections offset from the centers of the holes and engageable portions, the first intervals being in general alignment with the centers of the holes in a direction perpendicular to the length of the crawler body, and second intervals between the projections offset from the centers of the holes and engageable portions, the second intervals being in general alignment with the centers of the engageable portions in a direction perpendicular to the length of the crawler body, the first intervals being larger than the second intervals.

5. A highly elastic rubber crawler according to claim 4, wherein the inner peripheral layer, including said projections, is formed of a highly rigid urethane rubber, while the outer peripheral layer, including said lugs, is formed of an elastic member, and first high strength reinforcing cords are embedded in the inner peripheral layer parallel to the length of the crawler body, second high strength reinforcing cords are embedded in the inner peripheral layer, in the engageable portions, transverse to the length of the crawler body, the first and second high strength reinforcing cords being embedded adjacent to an interface between the inner peripheral layer and the outer peripheral layer.

6. A highly elastic rubber crawler according to claim 5, wherein the outer peripheral layer, including the lugs, is made of vulcanized natural rubber.

7. A highly elastic rubber crawler according to claim 5, wherein the first and second high strength reinforcing cords are the sole high strength reinforcement for the crawler body.

8. A highly elastic rubber crawler according to claim 5, wherein said first high strength reinforcing cords are positioned on both sides of said holes, the first high strength reinforcing cords on one side of the holes being spaced from the first high strength reinforcing cords on the other side of the holes, and said second high strength reinforcing cords have opposite ends, said second high strength reinforcing cords pass above and below said first high strength reinforcing cords, said opposite ends overlap one another in the space between the first high strength reinforcing cords, and the first and second high strength reinforcing cords are the sole high strength reinforcement for the crawler body.

9. A highly elastic rubber crawler according to claim 3, wherein the inner peripheral layer, including said projections, is formed of a highly rigid urethane rubber, while the outer peripheral layer, including said lugs, is formed of an elastic member, and first high strength reinforcing cords are embedded in the inner peripheral layer parallel to the length of the crawler body, second high strength reinforcing cords are embedded in the inner peripheral layer, in the engageable portions, transverse to the length of the crawler body, the first and second high strength reinforcing cords being embedded adjacent to an interface between the inner peripheral layer and the outer peripheral layer.

10. A highly elastic rubber crawler according to claim 9, wherein the outer peripheral layer, including the lugs, is made of vulcanized natural rubber.

11. A highly elastic rubber crawler according to claim 9, wherein the first and second high strength reinforcing cords are the sole high strength reinforcement for the crawler body.

12. A highly elastic rubber crawler according to claim 9, wherein said first high strength reinforcing cords are positioned on both sides of said holes, the first high strength reinforcing cords on one side of the holes being spaced from the first high strength reinforcing cords on the other side of the holes, and said second high strength reinforcing cords have opposite ends, said second high strength reinforcing cords pass above and below said first high strength reinforcing cords, said opposite ends overlap one another in the space between the first high strength reinforcing cords, and the first and second high strength reinforcing cords are the sole high strength reinforcement for the crawler body.

13. In combination, a crawler device having an idler having a width and a driving sprocket having teeth having tops and roots; and a highly elastic rubber crawler having an inner peripheral layer, an outer peripheral layer, first and second high strength reinforcing cords, engageable holes into which the tops of the teeth of the driving sprocket fit, said engageable holes being at a fixed interval, engageable portions for being in mesh with the roots of teeth of the driving sprocket, said engageable portions being between said engageable holes, projections for preventing the driving sprocket and the idler from falling off the crawler body, said projections being on the inner peripheral layer at both sides of said holes and said engageable portions, lugs projecting from the outer peripheral layer, wherein the inner peripheral layer including said projections is formed of highly rigid urethane rubber, the outer peripheral layer including said lugs is formed of an elastic member, the width of the idler is substantially equal to the transverse distance between said projections, and the first and second high strength reinforcing cords are the sole high strength reinforcement for the crawler body.

* * * * *